(12) United States Patent
Sandgren et al.

(10) Patent No.: US 8,503,655 B2
(45) Date of Patent: Aug. 6, 2013

(54) METHODS AND ARRANGEMENTS FOR GROUP SOUND TELECOMMUNICATION

(75) Inventors: Patrik Sandgren, Stockholm (SE); Anders Eriksson, Uppsala (SE); Tommy Falk, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 741 days.

(21) Appl. No.: 12/601,251

(22) PCT Filed: May 22, 2007

(86) PCT No.: PCT/SE2007/050344
§ 371 (c)(1),
(2), (4) Date: Mar. 25, 2010

(87) PCT Pub. No.: WO2008/143561
PCT Pub. Date: Nov. 27, 2008

(65) Prior Publication Data
US 2010/0215164 A1   Aug. 26, 2010

(51) Int. Cl.
*H04M 3/42* (2006.01)
*H04L 12/16* (2006.01)
*H04Q 11/00* (2006.01)

(52) U.S. Cl.
USPC ............ 379/202.01; 379/93.21; 379/158; 370/260; 455/416

(58) Field of Classification Search
USPC ............ 379/90.01, 93.01, 93.17, 93.21, 156, 379/157, 158, 201.01, 202.01, 207.01; 370/260, 370/261, 262, 263, 269; 455/414.1, 416
See application file for complete search history.

(56) References Cited

U.S. PATENT DOCUMENTS

| | | | |
|---|---|---|---|
| 5,778,082 A * | 7/1998 | Chu et al. | 381/92 |
| 6,516,066 B2 * | 2/2003 | Hayashi | 381/92 |
| 2003/0063574 A1 * | 4/2003 | Virolainen | 370/260 |
| 2004/0218745 A1 * | 11/2004 | O'Toole | 379/202.01 |
| 2005/0147257 A1 | 7/2005 | Melchior et al. | |
| 2006/0045294 A1 * | 3/2006 | Smyth | 381/309 |
| 2007/0025538 A1 * | 2/2007 | Jarske et al. | 379/202.01 |
| 2007/0291950 A1 * | 12/2007 | Kimura et al. | 381/20 |

* cited by examiner

*Primary Examiner* — Khai N Nguyen

(57) ABSTRACT

A method of audio scene management in a teleconference or other group sound telecommunication is presented, in which teleconference at least a first transmitting party, a second transmitting party and a receiving party participates. The method comprises receiving of signals representing sound of the first transmitting party and sound of the second transmitting party. The method further comprises obtaining of measures of sound activity for the first and second transmitting parties, respectively and selecting a first angle and/or a second angle based on the obtained measures of sound activity. The method further comprises processing of the received signals into processed signals such that sound from the first transmitting party is experienced by the receiving party as emanating from the first angle while sound from the second transmitting party is experienced as emanating from the second angle, with respect to the receiving party. Finally signals representing the processed signals are outputted.

33 Claims, 13 Drawing Sheets

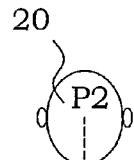
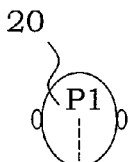
Fig. 3A
Fig. 3B
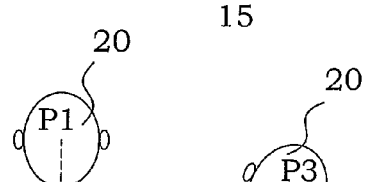
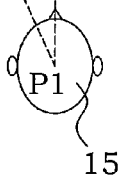
Fig. 3C
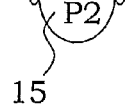
Fig. 3D

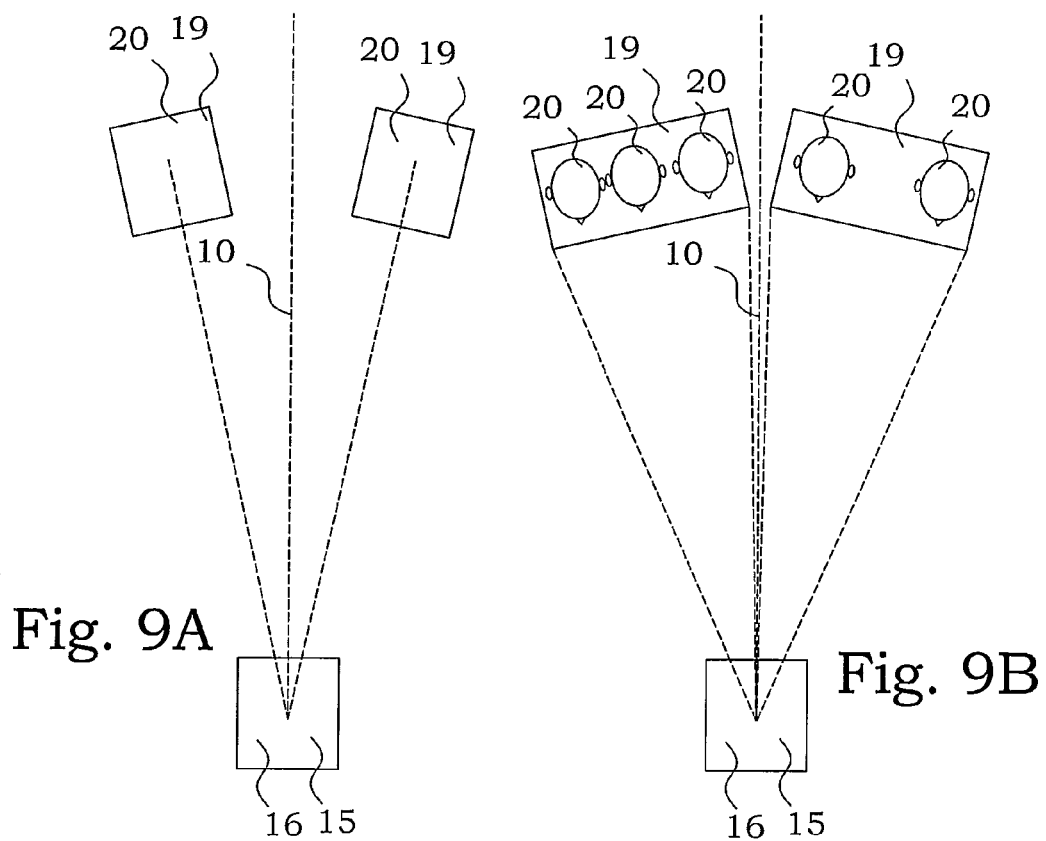
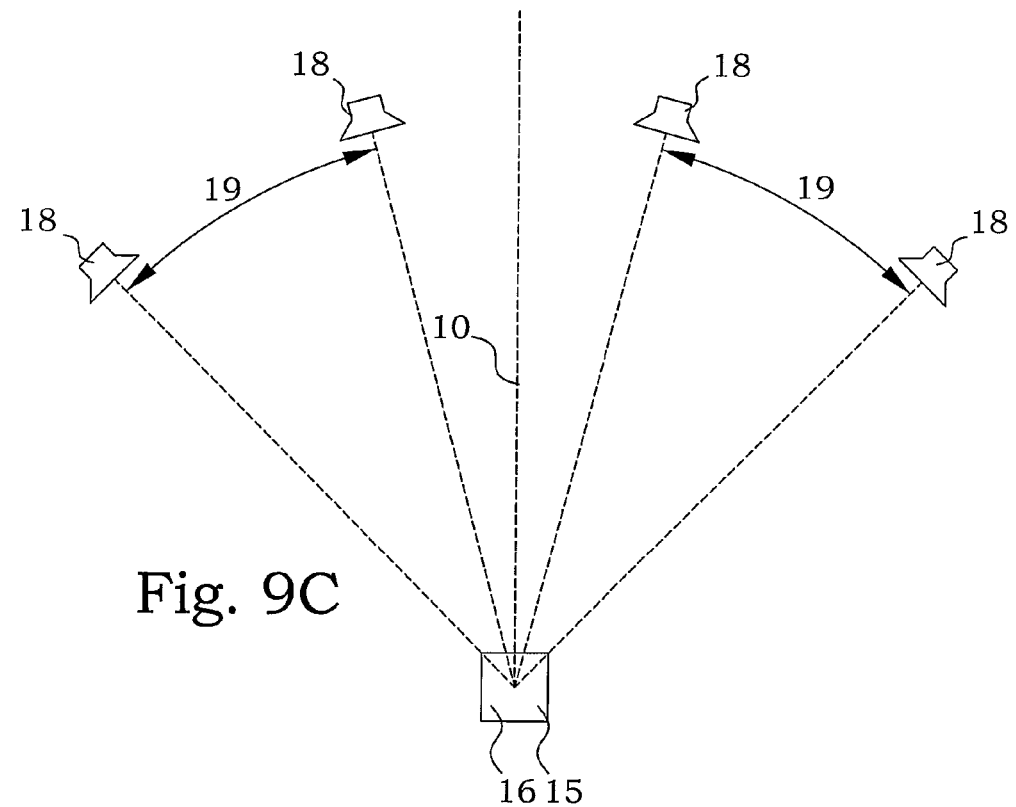

METHODS AND ARRANGEMENTS FOR GROUP SOUND TELECOMMUNICATION

TECHNICAL FIELD

The present invention relates in general to methods and devices for group sound telecommunication and in particular to such methods and devices being associated with perceived sound directions.

BACKGROUND

In many telecommunication systems of today, different kinds of teleconference services are offered. In a teleconference session, more than two parties can simultaneously participate and exchange information in any direction. A general struggle is to provide a communication situation that is as close as possible to a real world meeting.

In a real word meeting, the participant are usually located around a table and when someone talks, the other participants usually turn their heads towards the talker both in order to look at the talker as well as to maximize the correlation of the speech reaching respective ear. This maximizes the signal to noise ratio. When more than one person talk at the same time, the human hearing system is able to use the spatial distribution of the sound and separate the speech from the different sources and concentrate the hearing to a specific person if desirable. This phenomenon is known as the cocktail party effect.

In most commonly used teleconference systems, however, mono microphones capture the speech from different parties at different locations and add the signals together before they are sent back to the participating parties and played through loudspeakers or headphones. Persons listening to this will have problems with deciding which person talks and if several persons speak at the same time, it will be hard to separate the speech from the different talkers. The origins of the different sounds all appear to have the same spatial position, i.e. the position of the loudspeakers.

Adding video to the teleconference makes it easier to see which one is talking, but the problem when several persons talk simultaneously remains. The common solution to this in prior art is three-dimensional positional audio, which enables users to perceive sounds in a similar manner as in real meetings, i.e. hearing the direction and distance to a sound source. When three-dimensional (3D) audio is used properly in a teleconference, a virtual room can be reproduced with all parties or participants located at different positions.

The straightforward solution for positioning the participants in a virtual 3D audio teleconference is to put them evenly spread around a round table, as is common in the real world. The speech signal of respective talker is then 3D rendered in order to simulate the relative positions of the talkers with respect to a listener. The relative position of a certain participant will be different for all other participants, but the absolute position will be the same just as the case is for a real worlds meeting.

Positioning virtual persons around a table reflects a real conference meeting well in most aspects, except for that a listener is usually not able to turn its head towards the talker in a virtual teleconference. This will result in that the participants next to the listener will be heard far to the side. Such a situation does not resemble a real conference and is therefore experienced as unpleasant.

An obvious solution is of course to enable that a head turning of the listener influences the 3D rendering, as in real meetings. This, however, requires that head turning parameters must be sent to the teleconference renderer. To that end the listener must be active and turn the virtual head whenever a new participant starts to talk. Concentrating on turning the virtual head would probably steal the concentration from what the persons actually are saying during the meeting. Another solution would be to provide measures of a true head direction automatically and provide such coordinates to the teleconference renderer. However, such equipment then has to incorporate advanced positioning equipment.

SUMMARY

A general object of the present invention is to provide group sound telecommunication services presenting perceived spatially separated sound sources in a more listener-friendly way.

The above object is achieved by methods and arrangements according to the accompanying claims. In general words, in a first aspect, a method of audio scene management during a group sound telecommunication is presented, in which group sound telecommunication at least a first transmitting party, a second transmitting party and a receiving party participates. The method comprises receiving of signals representing sound of the first transmitting party and sound of the second transmitting party, processing of the received signals into processed signals such that sound from the first transmitting party is experienced by the receiving party as emanating from a first angle while sound from the second transmitting party is experienced as emanating from a second angle. The angles are defined with respect to the receiving party. The second angle is different from the first angle. The method further comprises obtaining of measures of sound activity for the first and second transmitting parties, respectively and adjusting of the first angle and/or the second angle based on the obtained measures of sound activity. Finally signals representing the processed signals are outputted.

In a second aspect, an audio scene manager device comprises a receiver receiving signals representing sound of at least a first transmitting party of a group sound telecommunication and sound of a second transmitting party of the group sound telecommunication. The audio scene manager device further comprises a processor connected to the receiver. The processor is arranged for processing the received signals into processed signals such that sound from the first transmitting party is experienced by the receiving party as emanating from a first angle while sound from the second transmitting party is experienced as emanating from a second angle. The angles are defined with respect to the receiving party. The second angle is different from the first angle. The audio scene manager device further comprises means for obtaining measures of sound activity for the first and second transmitting parties, respectively, connected to the processor. The processor is arranged for adjusting the first angle and/or the second angle based on the obtained measures of sound activity. The audio scene manager device also comprises an output connected to the processor for signals representing the processed signals.

In a third aspect, a telephone terminal comprises an audio scene manager device according to the second aspect.

In a fourth aspect, a bridge of group sound telecommunication comprises at least one audio scene manager device according to the second aspect.

In a fifth aspect, a telecommunication network comprises at least one of a telephone terminal according to the third aspect and a bridge of group sound telecommunication according to the fourth aspect.

One advantage with the present invention is that a more pleasant perception of sound of a teleconference is achieved without explicit actions taken by the receiving party. Other advantages are further described in connection with the detailed description.

BRIEF DESCRIPTION OF THE DRAWINGS

The invention, together with further objects and advantages thereof, may best be understood by making reference to the following description taken together with the accompanying drawings, in which:

FIGS. 3A-H are schematic illustrations of positioning of participants in a group sound telecommunication in a virtual room for different participants and number of other participants;

FIGS. 9A-C are schematic illustrations of positioning of participants in a group sound telecommunication in a virtual room when a real room comprises more than one participant.

DETAILED DESCRIPTION

In the present disclosure, the term "group sound telecommunication" is intended to encompass different kinds of activities where a plurality of participants situated at different physical sites communicate with each other at the same time in a group fashion. In other words, a receiver should be able to receive simultaneous transmissions from at least two other participants. Such "group sound telecommunication" comprises e.g. ordinary teleconference approaches, but also different solutions based on e.g. a push-to-talk concept. In the embodiments given below, the term "teleconference" may sometimes be used for exemplifying the principles of the present invention. However, the described embodiments should not be interpreted as limiting the scope to any particular teleconference standards or general interpretation of the term "teleconference". Instead, the embodiments below may be applied to many various systems for general group sound telecommunication.

A basic concept of the invention is to control the positioning of virtual persons in virtual rooms for group sound telecommunication applications. By controlling the positioning and adaptively moving the virtual persons, the spatial separation between sound sources can be optimized and the resulting virtual rooms can be perceived as natural meetings.

Figure 1A:
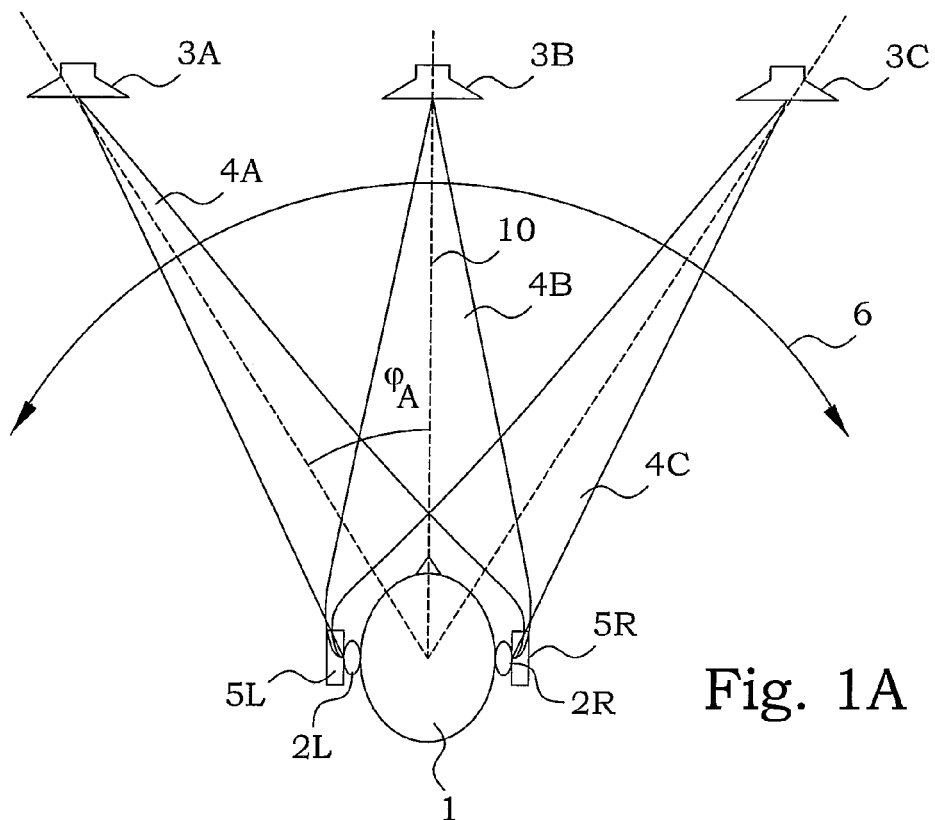
FIG. 1A is a schematic illustration of relations between sound signals and virtual spatial positioning when utilising headphones.

The human being has a well developed skill to distinguish a certain direction and to a certain amount also distance to a source of sound. As illustrated in FIG. 1A, a human being 1 has two ears 2L and 2R. A sound source 3A emits sound waves 4A which propagates through the air to the human being 1. The sound source 3A is illustrated to be situated at the left side of the human being 1, and the sound waves 4A reaches the left ear 2L in a direct manner, while the sound waves have to be refracted around the head of the human being 1 in order to reach the right ear 2R. Such refraction together with the fact that the propagation time to the left ear 2L is shorter than to the right ear 2R produces differences in the perceived sound as detected by the left and right ear, respectively. Also reflections and refractions within the ear contribute to a modification of the perceived sound. All such differences are interpreted by the human brain in terms of a direction from which the sound is experienced to come. Sound originating at other positions, e.g. from the sound source 3B in front of the human being 1 or from the sound source 3C to the right, propagate as sound waves 4B and 4C and gives rise to position information by the human being 1.

Also some kind of feeling of the distance to the sound source is often possible to have. Reflections and refractions in the surrounding will also contribute to a general perception of the sound and may be interpreted e.g. in terms of a small or large space around the human being 1. The interaction with the surroundings and the propagation of the waves will typically introduce changes in the sound waves including delays and frequency dependent attenuation. The human being 1 may therefore have certain space information even if he doesn't use his eyes.

If the modifications of the sound waves are known, the sound that actually reaching the ears 2L and 2R of the human being may be synthesised and provided to the ears e.g. by a pair of headphones 5L and 5R. This is normally referred to as HRTF filtering (Head-Related Transfer Function). In such a way, a human being carrying to the headphones 5L, 5R can be given the impression that a certain sound originates at a certain position. This is the basic idea of three-dimensional positional audio. A virtual room can in such a way be produced by modifying different sound sources as if they originated at different positions in the virtual room.

Mathematically, the modification can be seen as a filtering of a sound signal to achieve a left and right signal, respectively.

$$x_L(t) = h_L(t,p) * s(t),$$

$$x_R(t) = h_R(t,p) * s(t)$$

where $x_L(t)$ and $x_R(t)$ are the sound signals to the left and right ear respectively, $s(t)$ is the original sound and $h_L(t,p)$ and $h_R(t,p)$ are left and right filters, respectively, being dependent on the sound origin position p in the virtual room. The position p can be expressed e.g. in polar coordinates, i.e. $p(r,\theta,\phi)$, where $\phi$ may be defined as an angle with respect to a front direction 10 of a receiving party of the sound, i.e. the human being of FIG. 1A. The filters typically have different response for different frequencies in the sound, i.e. a frequency dependent attenuation, as well as delays introduced by the propagation time. If reflection processes also are modelled, different delays and in a general case a distribution of delays are involved.

Having more than one sound source in a virtual room leads to a superpositioning of the individual signals. A virtual room corresponding to the situation in FIG. 1A can thus be expressed as:

$$x_L(t) = h_L(t,p_A) * s_A(t) + h_L(t,p_B) * s_B(t) + h_L(t,p_C) * s_C(t).$$

$$x_R(t) = h_R(t,p_A) * s_A(t) + h_R(t,p_B) * s_B(t) + h_R(t,p_C) * s_C(t)$$

The virtual room that is possible to provide by using headphones may in principle fill the entire space around the human being, i.e. even behind the listener. However, in most cases in virtual group sound telecommunication, the virtual room is limited to the space in front of the listener, as illustrated by the double arrow 6.

Figure 1B:
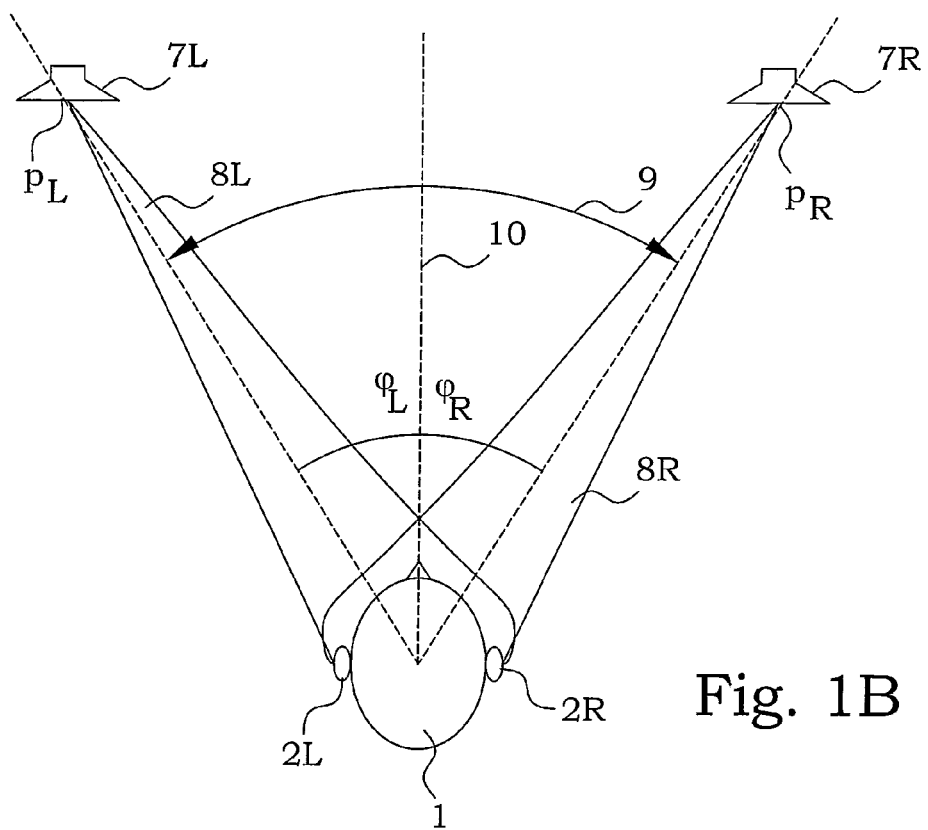
FIG. 1B is a schematic illustration of relations between sound signals and virtual spatial positioning when utilising stereo loudspeakers.

Three-dimensional positional audio is also possible to achieve by the use of two or more speakers 7R and 7L, as illustrated in FIG. 1B. However, in such a case, there is a real sound wave 8L, 8R propagation between the speakers and the human being 1. The sound coming from one speaker will therefore be able to reach both ears 2R, 2L, which means that the perceived sound is "filtered" once more. However, if filters are used that combined with the filter action provided by the real room give rise to the requested right and left signals, a virtual room can be achieved also in such a case. If so-called crosstalk cancellation is used, one may achieve that the same sound will reach the ears as in the case of headphones. The mathematical formulation becomes:

$$x_L(t) = h^R_L(t,p_L)*h_L(t,p)*s(t) + h^R_L(t,p_R)*h_R(t,p)*s(t),$$

$$x_R(t) = h^R_R(t,p_L)*h_L(t,p)*s(t) + h^R_R(t,p_R)*h_R(t,p)*s(t)$$

where $h^r_L$ and $h^R_R$ denotes the filter functions corresponding to the real room and the crosstalk cancellation and $p_L$ and $p_R$ denotes the positions of the left and right speakers, respectively. A process of providing processed signals such that sound from a sound source is being experienced as emanating from a specified angle with respect to a front direction of the receiving party thus comprises creation of a left signal based on a source sound filtered by a left filter being dependent on at least the specified angle and creation of a right signal based on a source sound filtered by a right filter being dependent on at least the specified angle. If more than one sound is to be present in the virtual room at different positions, the left and right signals are composed on terms of respective sound sources filtered by left and right filters being dependent on a respective angle. The actual configuration of the filter then depends on whether headphones or speakers are used.

If cross-talk cancellation is not available, a practical limit will, however, be that the angles to the speakers set a maximum angle 9 within which sound sources can be positioned in the virtual room. In such case, a simple stereo panning can instead be applied:

$$x_L(t) = a_L \cdot s(t),$$

$$x_R(t) = a_R \cdot s(t)$$

where $a_R$ and $a_L$ are constants and $a_R + a_L = 1$.

These concepts are easily extended to other audio systems providing spatial perceptions of sound. A non-exclusive example is e.g. the 5.1 surround audio system. In such cases, at least two signals are provided based on the signals provided from the transmitting parties and filtered by suitable filters that are depending on the angle from which the transmitting party is placed in the virtual room. In the 5.1 surround audio system, a total of six signals are provided in order to produce a complete spatial perception for the receiving party.

The actual filters to be used are dependent on the specific applications and the details thereof are of no importance for achieving the technical effect of the present invention. Since such filter constructions are available in prior art as such, this will not be further discussed in the present disclosure.

Figure 2:
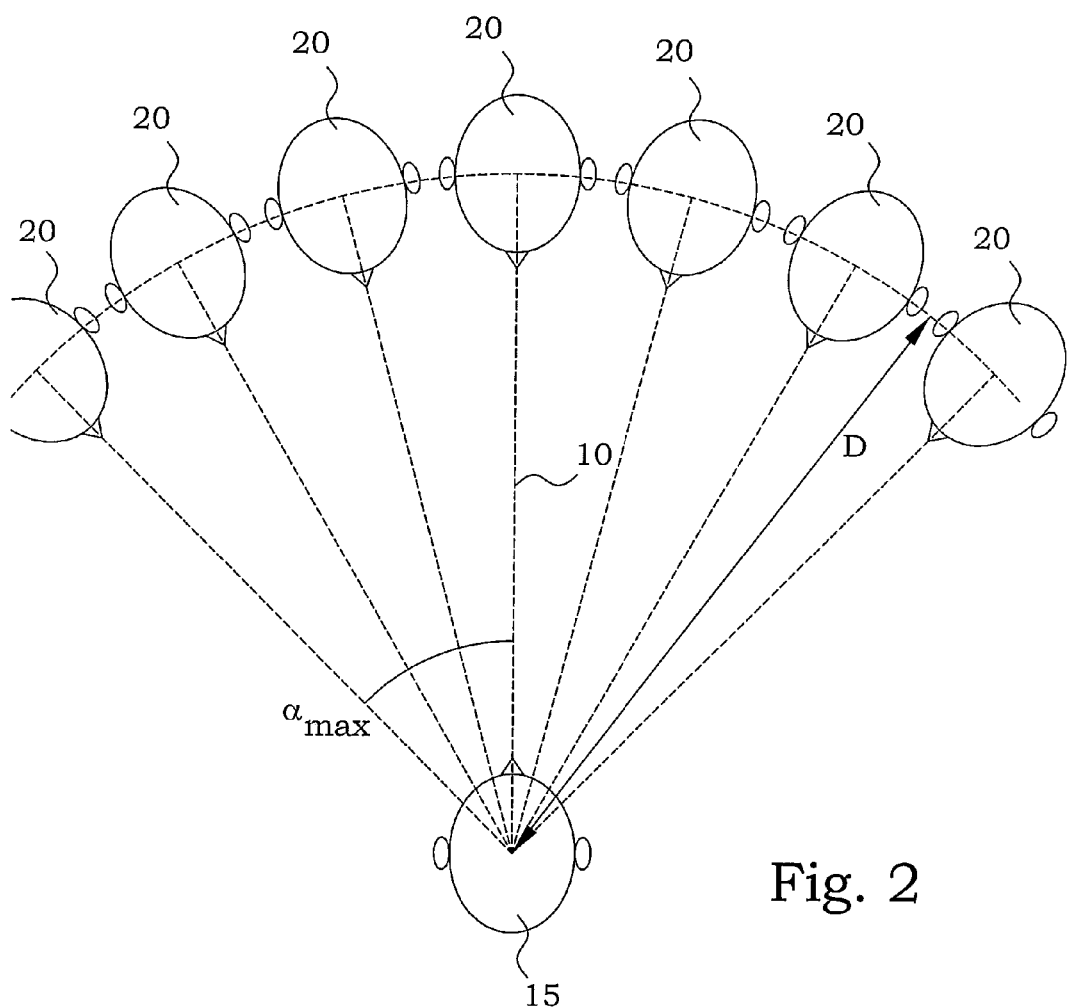
FIG. 2 is a schematic illustration of positioning of participants in a group sound telecommunication in a virtual room.

One of the basic concepts of the present invention is to position participants of a group sound telecommunication at different angles with respect to a listener. In other words, signals received from a number of transmitting parties are processed into processed signals, e.g. according to the above ideas, such that sound from each transmitting party is experienced as emanating from different angles with respect e.g. to a front direction of a receiving party. Such a virtual room is illustrated in FIG. 2. A number of transmitting parties 20 are positioned at different angles with respect to a receiving party 15, and in particular with respect to a front direction 10 of the receiving party 15. Preferably, a maximum angle $a_{max}$ limits the far left and far right transmitting party to angles that will not sound unpleasant for the receiving party.

The transmitting parties are now located a little closer to each other than for a method that placed the participants evenly around a round table, but the transmitting parties may still be separated apart due to the spatial separation ability of the human hearing system. Although all participants will hear the scene in this way, the relative placement of the listeners can be maintained, e.g. participant x will always be positioned to the left of participant y in the virtual room. Since even the far left and far right talker sounds fairly pleasant to the listener, there is no need of turning the head.

If the distance from the listener to different participants in a group sound telecommunication in a virtual room varies much, this will result in that the speech from different participants will be attenuated differently during the 3D audio rendering. Speech from persons virtually close to the listener will be attenuated much less than persons placed further away. Therefore, in a particular embodiment, all transmitting parties 20 are placed on an arc at the same distance D from the receiving party 15. Since the transmitting parties are placed at the same distance from the receiving party, the distance attenuation will be the same for all transmitting parties.

However, in alternative embodiments, different participants may be positioned in the virtual room at different distances.

When initiating a teleconference, one user after another typically calls the conference bridge or is being called. Since the local or central positioning controller usually beforehand do not know the number of users that eventually will participate, positioning the virtual users in the virtual rooms is not obvious. A general desire is to achieve some kind of a symmetrical virtual scene. The teleconference starts when two users are connected and the virtual room for a first participant is in one embodiment setup as shown in FIG. 3A. A participant P1 is a receiving party 15 in this virtual room, receiving sound signals from a transmitting party 20, in this case participant P2. The transmitting party 20 is here positioned in front of the receiving party, i.e. at an angle with respect to the front direction 10 of the receiving party 15 equal to 0.

In FIG. 3B, a corresponding virtual room for the other participant is illustrated. Here, participant P2 is the receiving party 15 and participant P1 is the transmitting party 20. Also here, a head-on configuration is utilized. The two first users are thus positioned straight opposite to each other in both virtual rooms, i.e. the principles of positioning in FIG. 3A and 3B are the same in the present embodiment. However, this is not any necessity and the positioning in each of the virtual rooms of participating parties can be made totally independent of each other.

When a third participant is connected it should according to the present invention be positioned so that it becomes spatially separated from the already present participants. At this occasion, the conversation can be denoted a teleconference. The virtual room of participant P1 is shown in FIG. 3C. Participant P3 constitutes here a second transmitting party 20 and has been positioned so it is spatially separated from the earlier present transmitting party. In the present embodiment, the participant P1 is placed at a position with an angle α counter clockwise with respect to the front direction 10 of the receiving party 15.

A virtual room for participant P2 is illustrated in FIG. 3D. In order to maintain the same cyclic order between the different participants, participant P3 is here positioned to the right of participant P1, in this embodiment at an angle α clockwise with respect to the front direction 10 of the receiving party 15. Participant P3 is thereby positioned to the left of participant P1 in both virtual rooms, which maintains the relative placement of the users. However, as mentioned above, such relations between the different virtual rooms of the different participants are not necessary to achieve the technical effect of the present invention, but can be considered as a preferred embodiment. A virtual room is also created for the participant P3 as receiving party, however, not illustrated here.

Figure 3E:
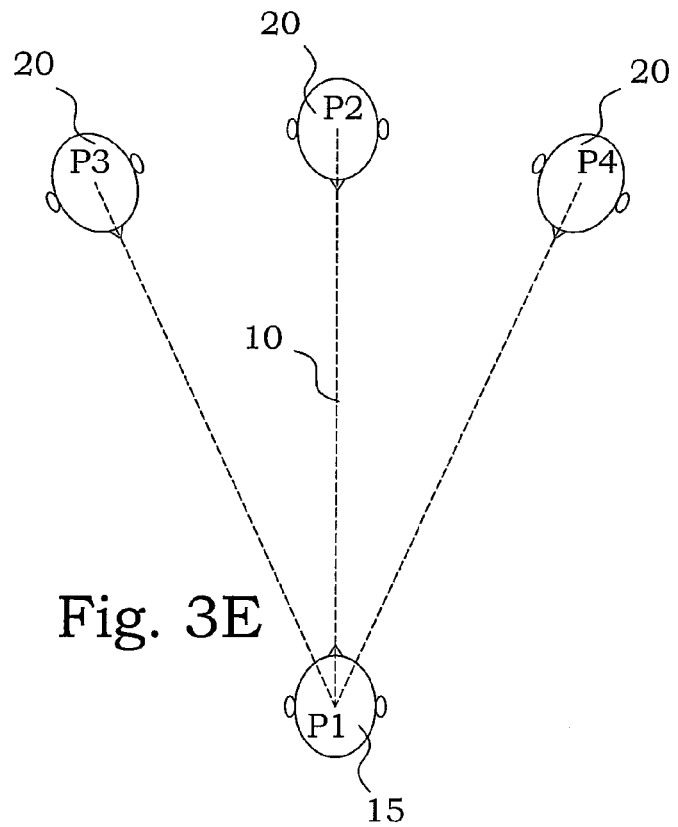
Figure 3F:
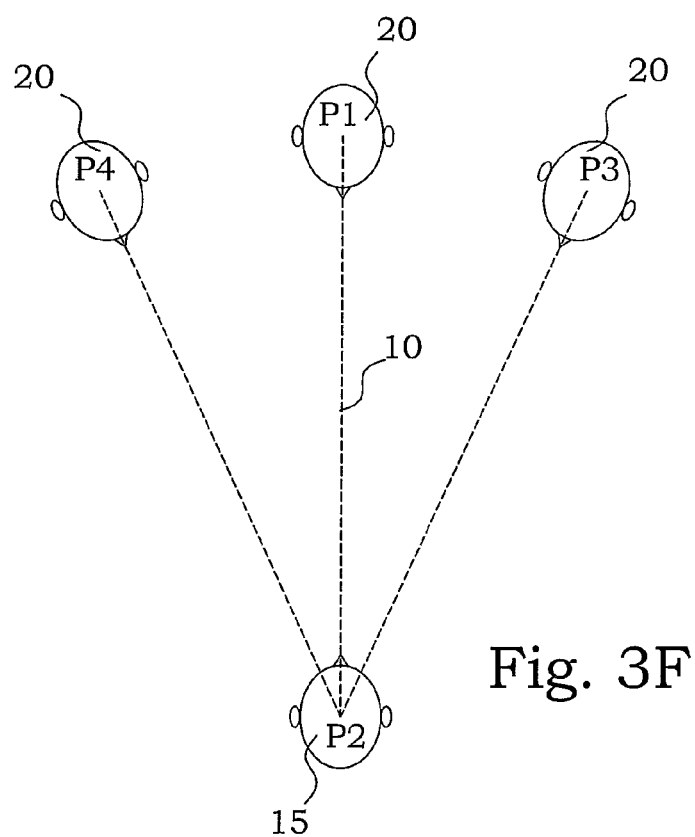

Now, assume that one more new participant P4 is connected, then in one embodiment an obvious position for the new participant in the two virtual rooms is at the same absolute angle a as participant P3, but on the other side. This is illustrated in FIGS. 3E and 3F. The virtual scenes thus became symmetrical again for participants P1 and P2.

Figure 3G:
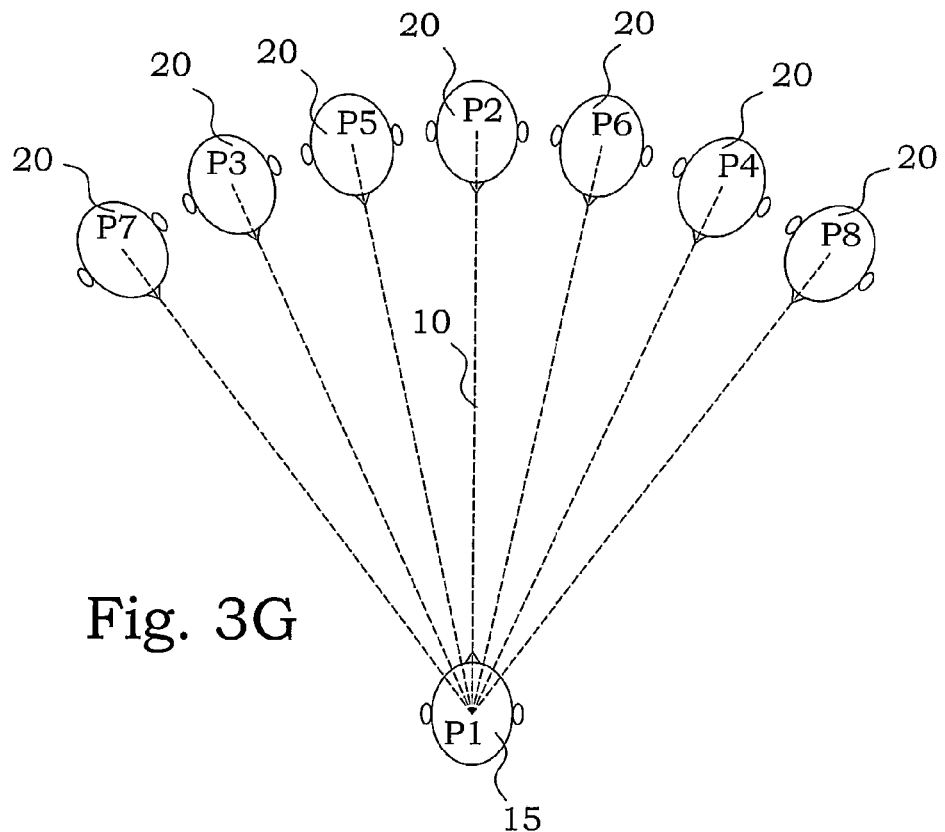
Figure 3H:
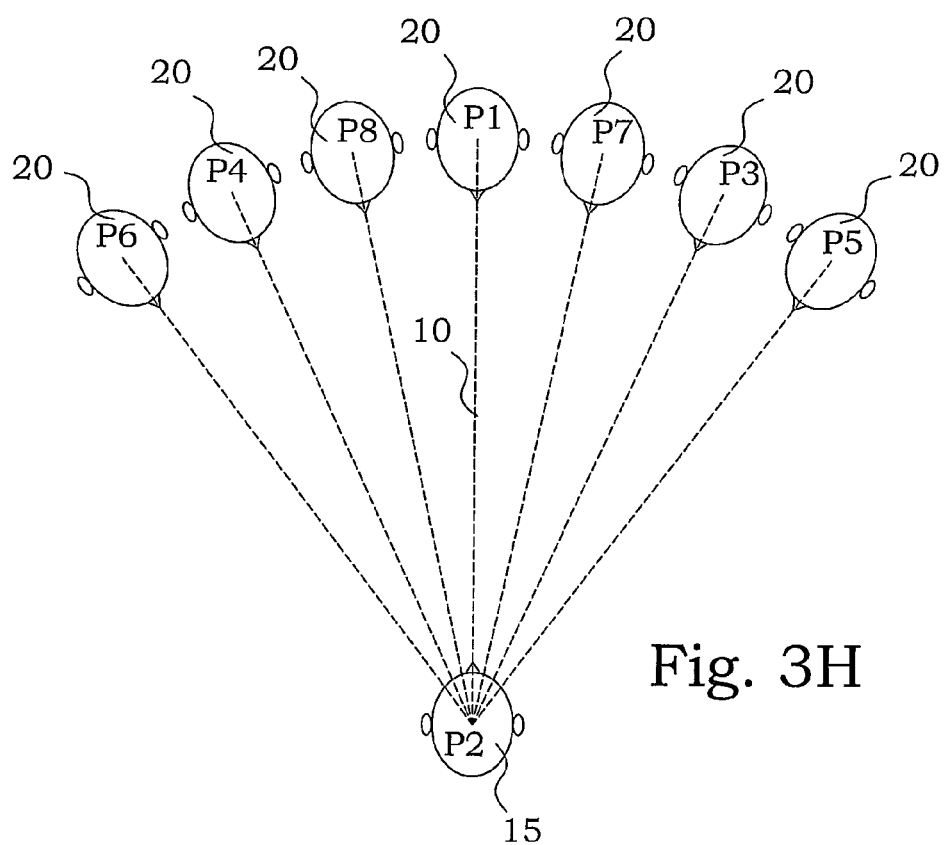

The addition of more participants can then be performed in an analogue manner. Assuming that four more participants P5-P8 are connected in a similar way, virtual rooms for participant P1 and P2 are obtained as illustrated in FIGS. 3G and 3H. As seen, the virtual rooms are symmetric and the relative placement of the participants is the same for participant P1 and P2, e.g. participant P4 is located between participants P6 and P8.

The maximum angle $\alpha_{max}$ within which transmitting parties 20 are positioned in the virtual room is preferably less than 90 degrees, since one of the objectives of the invention is to reduce the amount of sound received from a large angle. Preferably, received signals from the transmitting parties 20 are processed into processed signals such that sound from all transmitting parties 20 are being experienced as emanating within an angle sector of 120 degrees. In a further preferred embodiment, the angle sector is centred around the front direction 10. In other words, all transmitting parties should be placed within a maximum angle $\alpha_{max}$ of 60 degrees in either direction. Even more preferably, the angle sector is not larger than 90, and in an embodiment centred around the front direction 10, the maximum angle $\alpha_{max}$ is then set to 45 degrees.

For teleconferences with only a few participants, it is possible to use a quite small maximum angle $\alpha_{max}$. However, when the number of participants increases, the angle separation between evenly spread individual participants within the allowed angle sector becomes smaller and smaller. At some occasion, a limit is reached where the small angle separation is experienced as a larger inconvenience than a large absolute angle. In one embodiment of the present invention, the processing of the sound signals is therefore dependent on the total number of parties of the teleconference. An angle sector within which transmitting parties are allowed can thereby be dependent on the number of participating parties. Typically, the allowed angle sector is increased for a larger number of participants.

Returning to FIGS. 3C and 3D, a remaining problem is that the virtual scenes are not symmetric for participants P1 and P2. The virtual room for participant P3, however, can be made symmetric instantly since it is known that there are two other participants present and participants P1 and P2 should be positioned on opposite side in front of participant P3. The skew audio scenes for participants P1 and P2 cause no problems if more participants are to be connected, since they can be placed at positions resulting in symmetric scenes. However, if no more participants are connected it may be annoying in a longer conference.

Figures 4A, 4B:
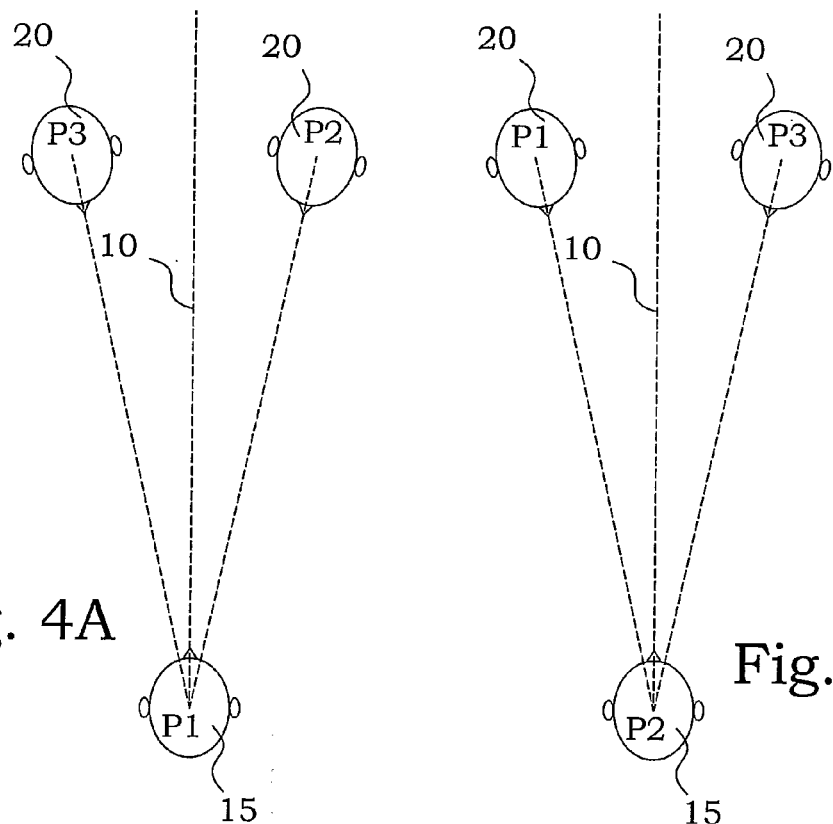
FIG. 4A-B are schematic illustrations of adapted positioning of participants in a group sound telecommunication in a virtual room.

A solution to this can be as follows. If no more participants are being connected after a certain time it is assumed that no more users will be connected within a reasonable time. The present virtual participants can then slowly be moved in the virtual room until symmetrical scenes have been obtained. FIGS. 4A and B illustrate such adapted virtual rooms for participant P1 and P2, if no more than the participant P3 is added. Such adaptation into a symmetrical configuration is easiest achieved by a simple rotation of the room around the receiving party 15. Possibly, an adjustment of the angle distance between different transmitting parties may be desired, if the teleconference include more than the participants. Also an adjustment of the maximum used angle can be of interest, e.g. if the angle distances between adjacent transmitting parties are small.

It is here noticed that in a preferred embodiment, such adaptations of the angle positions of transmitting parties are performed gradually and using a relatively slow speed, in order not to cause any sudden changes in the conference environment. As mentioned above, if no information is available whether more participants are expected or not, it is also preferred to wait for a time-out period before any change at all is made. It is also preferred to make any adaptations in angles to the transmitting parties in such a way that the mutual order is not changed. A new party appearing between two other parties should also after angle adaptation be positioned between the same two other parties. In other words, in a preferred embodiment a mutual order of angles of all transmitting parties of a teleconference is maintained during adjustment of the angles.

Even though the human hearing system is good at separating sound sources, there is still a limit of how close two sound sources can be placed. Since the talkers are located closer to each other in the above presented configuration than when they were positioned around a round table, it also means that this method can handle fewer participants if just concerning the spatial separation of talkers. One solution to this can be to constrain the relative angle to a talker when the number of participants is less than a certain number. However, this put constrains in the number of participants According to the present invention, another solution can be to release the request to position the participants at equal angle distances. By obtaining measures of sound activity for the different transmitting parties, angle separation to adjacent or closest neighbour transmitting parties can be adjusted depending on the obtained measures of sound activity. Preferably, transmitting parties that are most active are adaptively separated from adjacent transmitting parties, while more inactive transmitting parties can be moved closer to each other. In other words, the participants that talk the most are given more space. During a meeting with many participants there are usually quite many persons that only listen, which means that there are no gains at separating these spatially. However, since the group sound telecommunication renderer does not know beforehand which persons that will be most active, the separation algorithm must be made adaptive. The scene can be rendered dynamically and changed with respect to which participants speak the most.

Figure 5A:
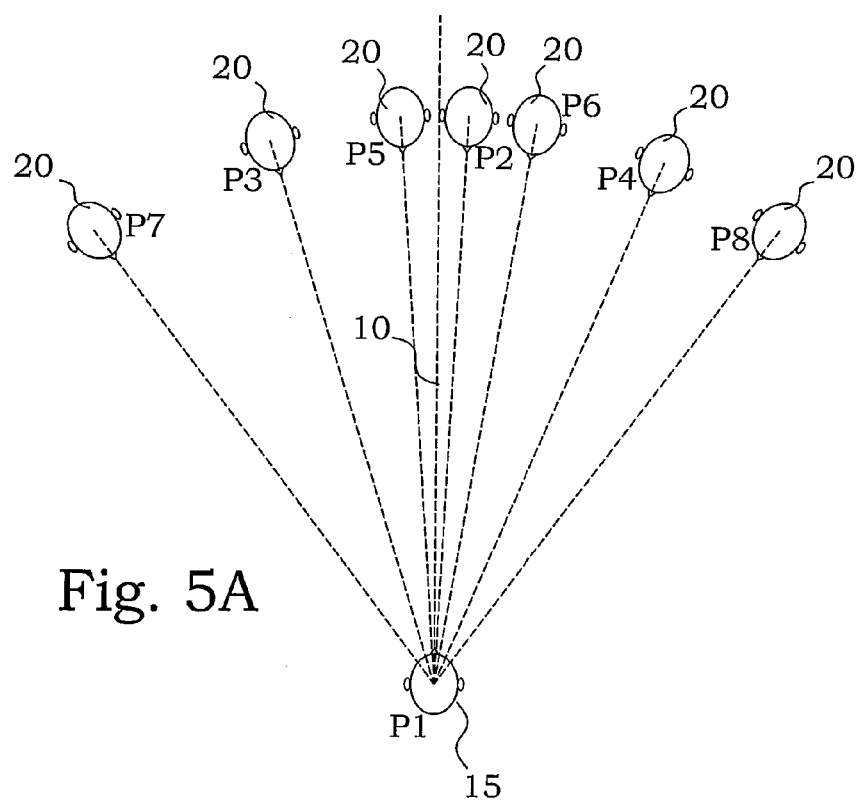
FIG. 5A-C are schematic illustrations of other adapted positioning of participants in a group sound telecommunication in a virtual room.

Consider FIG. 3G. Here, seven transmitting parties P2-P8 are present in the group sound telecommunication and as an initial configuration, they are evenly spread over the available angle sector from $-\alpha_{hd max}$ to $\alpha_{max}$. When the actual group sound telecommunication starts, participants P7, P3 and P4 are the ones talking most of the time, i.e. the transmitting parties that have the highest sound activity. After an adjustment of angles, based on this knowledge of sound activity, the situation may instead look as in FIG. 5A. One has here separated participants P7, P4 and P3 from their closest neighbours and instead moved participants P5, P2 and P6 closer together. As seen, the angle distance between participant P7 and P3 has increased resulting in that the listener can separate them more easily, while participant P5, P2 and P6 have been squeezed together. This does not affect the listener's perception, since they are more or less inactive. Participant P3 is now also closer to the active P4, but the angle distance is still large so there is no problem with that. As with the other adaptive methods described earlier, the automatic movements of the virtual persons should preferably be shown in the listener's GUI (Graphical User Interface) in order to avoid confusion. As a conclusion, the participants that talk the most have thus been separated apart while the silent participants have been squeezed together.

Figure 5B:
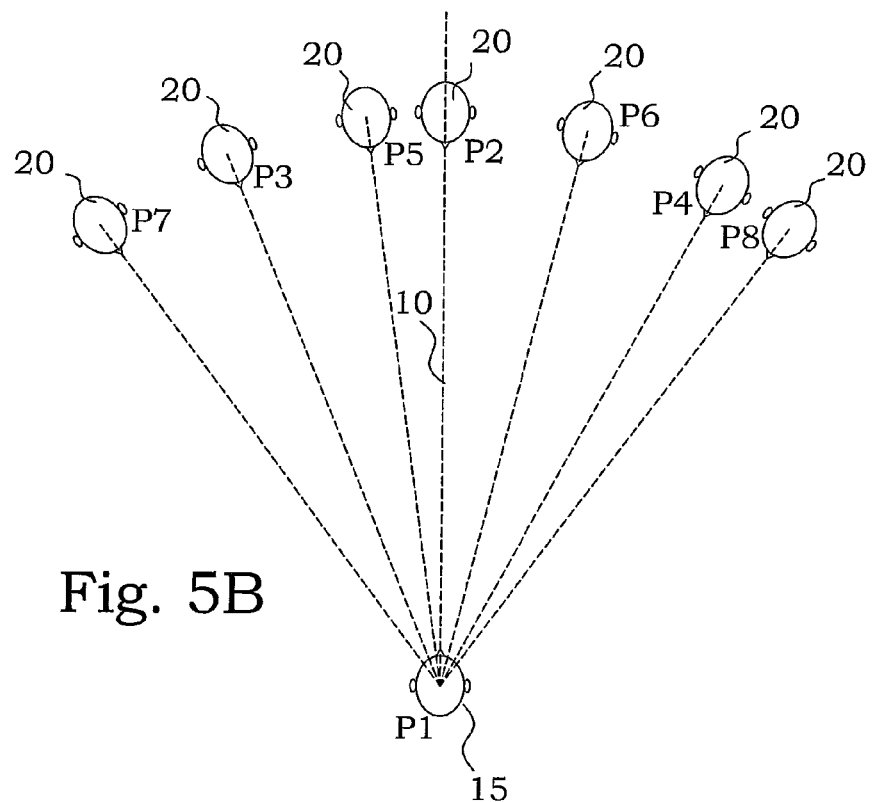

If now the conference changes its character and participants P7 and P4 becomes more or less silent, while participant P3 continues to speak. A previously quiet participant P6 now also becomes the most active. After a new adaptation of the angle positions, a situation such as illustrated in FIG. 5B may be obtained.

The actual rules how to divide the available angle sector to the different parties may be configured in various manners and is preferably adapted to different applications. In one embodiment, a minimum angle sector is given to each participant, perhaps also dependent on the total number of participants. The remaining part of the available angle sector is then distributed to the different parties proportionally to their sound activity during a specified time period.

In another embodiment, each sound activity measure is compared with a threshold value and participants having a measured sound activity exceeding the threshold value are classified as active. Remaining participants are classified as passive. The active participants are each assigned a certain active party angle sector, while the passive participants have to share the remaining angle sectors. The active party angle sector may also be dependent on the proportion between active and passive participants.

In yet another embodiment, each party is not assigned a certain angle, but instead a minimum angle separation to a closest neighbour is adjusted. This means that the angle separation between two active participants is reduced slightly compared to the embodiments above.

Yet another embodiment is to formulate a sound density measure around each participant and use an algorithm to minimize the maximum of such sound density measures. As sound density measure could be used a ratio between the sound activity measure and the sum of distances to the closest neighbour party on each side. In such a way, the amount of sound is spread out over the entire available angle sector as evenly as possible.

Anyone skilled in the art realizes that there are lots of other possible variations and modifications to adjust angles based on sound activity measures.

There are different methodologies for determining the actual positions to be rendered. One direct approach is to keep a separate description of each virtual room and making any adaptation in each room. This is a typical approach where the rendering is performed locally at each party. For centralized configurations, discussed more in detail below, it may be convenient to make any adjustments or angle selections centrally for all participants. In such a case, it may be convenient to have a "common" virtual room, where all participants are spread out along a circle, i.e. as they were sitting around a round table. The angle separations between the participants can then be adjusted around the round table e.g. depending on the speech activity. In order to achieve the individual virtual rooms, the round table configuration is transformed e.g. into a circle arc, having the intended receiver in the centre. Such a common virtual room can also be useful when originally positioning a new participant.

Another problem is when a very active participant is given an angle position with a high angle with respect to the front direction. It might be experienced as uncomfortable to listen much on speech arriving in a high angle of incidence. According to one embodiment of the present invention, the adjustment of the angle position comprises reduction of an angle with respect to the front direction for the transmitting party having a highest obtained measure of sound activity.

Figure 5C:
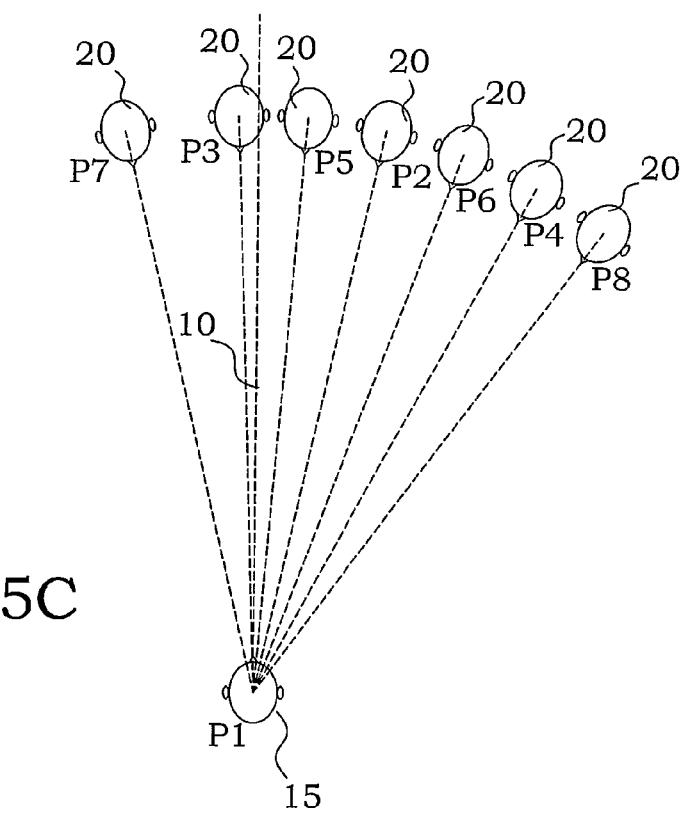

If an original configuration is as shown in FIG. 3G and transmitting party P7 is the far most active, the conference situation may be experienced as uncomfortable. By adjusting the angle positions taking measures of sound activity into account, a situation such as in FIG. 5C can be obtained. Even if the participants P2-6 and P8 thereby are positioned closer together, the overall conference situation may be improved, since the closely positioned parties are relatively inactive.

Another problem is what the listener should do if the participants on each side are having a conversation. The listener would probably either turn the head very frequently or just look straight ahead resulting in "far to the side" positions of the talkers. By decreasing the angle according to the principles above, such effects will be reduced. If also not only the party with the highest sound activity is adjusted in such away, both parties can be moved closer together, thereby reducing the utilised angle sector.

In a presently preferred embodiment, angle adjustment is performed for reducing the absolute angle for active participants as well as for increasing the angle separation to a closest neighbour for active participants. Algorithms for finding a suitable compromise may be designed in many different ways. One way is to create scoring points of each process and apply a minimization algorithm to reduce a total number of scoring points.

If more users want to connect at a later occasion, this is not a big problem since there are still positions available for the new participants to be placed at originally. By then utilising adjustment principles, e.g. according to the above described ideas, optimum positioning can then successively be obtained.

However, adjusting the scene too fast or assuming too frequently that no more users will be connected may cause confusion for the participants. This is particularly relevant if no feedback is given to any GUI of the participants' terminals. The scene might then change several times and in a fast manner and it may be difficult for a participant to follow how the virtual persons are being moved. Therefore, the time period before the adjustment starts should be set large enough so that the scene is not adjusted too soon after a new participant is connected or after a change in sound activity has occurred.

Figure 6:
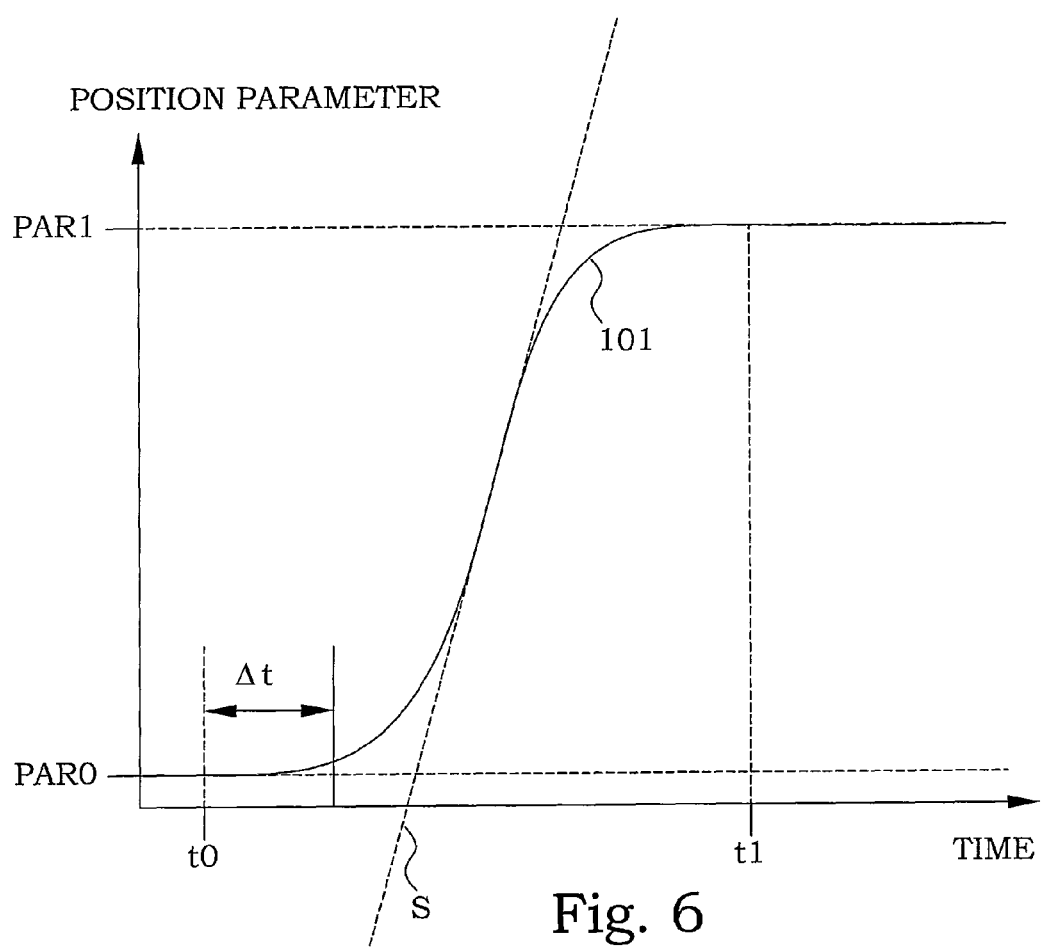
FIG. 6 is a schematic illustration of adaptation timing.

FIG. 6 illustrates a time diagram of an embodiment of an adjustment routine according to the present invention of a position parameter in a virtual room that is the object for an adjustment. At time t0, a change in sound activity in the system occurs, which according to an adjustment principle requires adjustment of a position parameter from a value of PAR0 to the value of PAR1. If the change in sound activity is temporary, any adjustment may be unnecessary. It is therefore desirable that any adjustment is not initiated immediately when a change occur. As seen in FIG. 6, illustrated by curve 101, no significant adjustment is performed until a time At after the onset of the change. However, if the change continues, an adjustment is desirable and a smooth adjustment of the position parameter to a value PAR1 is made. The transition should be slow enough not to disturb the group sound telecommunication, but fast enough to respond to trend changes in the communication pattern of the group sound telecommunication. In other words, the maximum slope S should be small enough not to be noticed as any annoying effect by the receiving party. However, the time t1, when the entire change is made should not be too far from the initiation time t0.

A time behaviour similar to what is shown in FIG. 6 may be achieved by applying a time filter on true sound activity measures and using the output from the time filter as the measure of sound activity. In one embodiment, the filter comprises a delay, providing for the delay of the start of adjusting. The time delay for the adjustment start may also be provided by different kinds of averaging procedures. In one embodiment, an average of true sound activity measures within a time-sliding window gives a delay for the adjustment start. In other words, an average taken over a period in time related to the present time is used. The width of the time-sliding window determines also the steepness of the adjustment. Such averaging process may also be combined with additional delays.

In alternative embodiments, different kinds of procedures involving time filters can be applied.

The time behaviour of the adjustment may in further alternative embodiments be incorporated in the adjustment routines directly. For instance, a set value could be based on the present sound activity or a delayed sound activity, and a routine for changing the parameters to that set value with certain time constants can be used.

Figure 7:
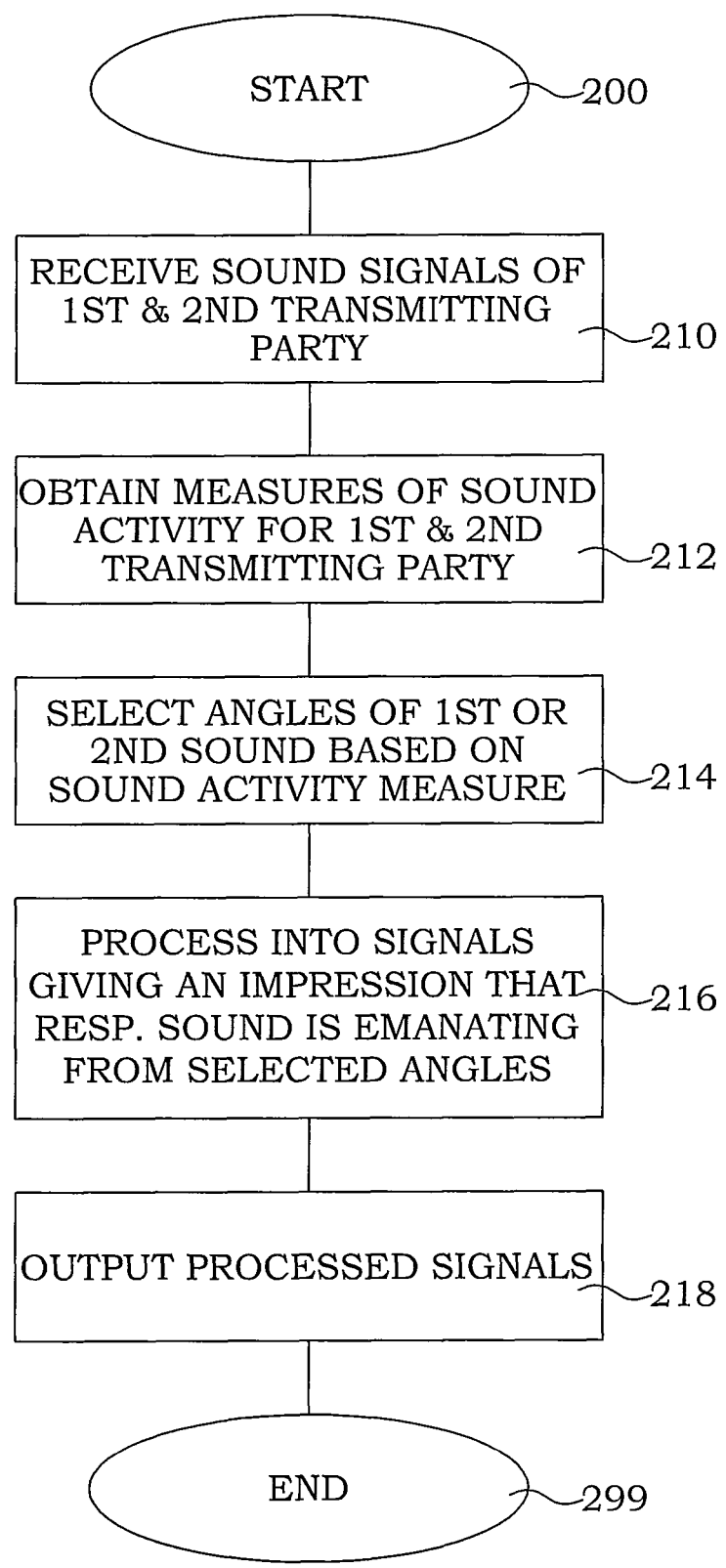
FIG. 7 is a flow diagram of steps of an embodiment of a method according to the present invention.

A flow diagram of an embodiment of a method according to the present invention is illustrated in FIG. 7. The method of audio scene management starts in step 200. The audio scene management comprises at least a first transmitting party, a second transmitting party and a receiving party. In step 210, signals representing sound of the first transmitting party and sound of the second transmitting party are received. In step 212, measures of sound activity for the first and second transmitting parties are obtained. In step 214, at least one of a first angle and a second angle is selected based on the obtained measures of sound activity. The received signals are processed in step 216 into processed signals such that sound from the first transmitting party is experienced as emanating from the first angle with respect to a front direction of the receiving party and sound from the second transmitting party is experienced as emanating from the second angle with respect to the front direction of the receiving party. In other words, the processed signals give an impression that the respective sound is emanating from different spatial positions. The second angle is different from the first angle, in order to spatially separate the first and second transmitting party. Finally, in step 218, signals representing the processed signals, possibly according to adjusted angles, are outputted. The procedure ends in step 299. The first and second angles could be selected in different manners. One approach is to first set the angles to standard values and then adjust the angles according to the sound activity. Another approach is to directly select angles in dependence of the sound activity.

Figure 8A:
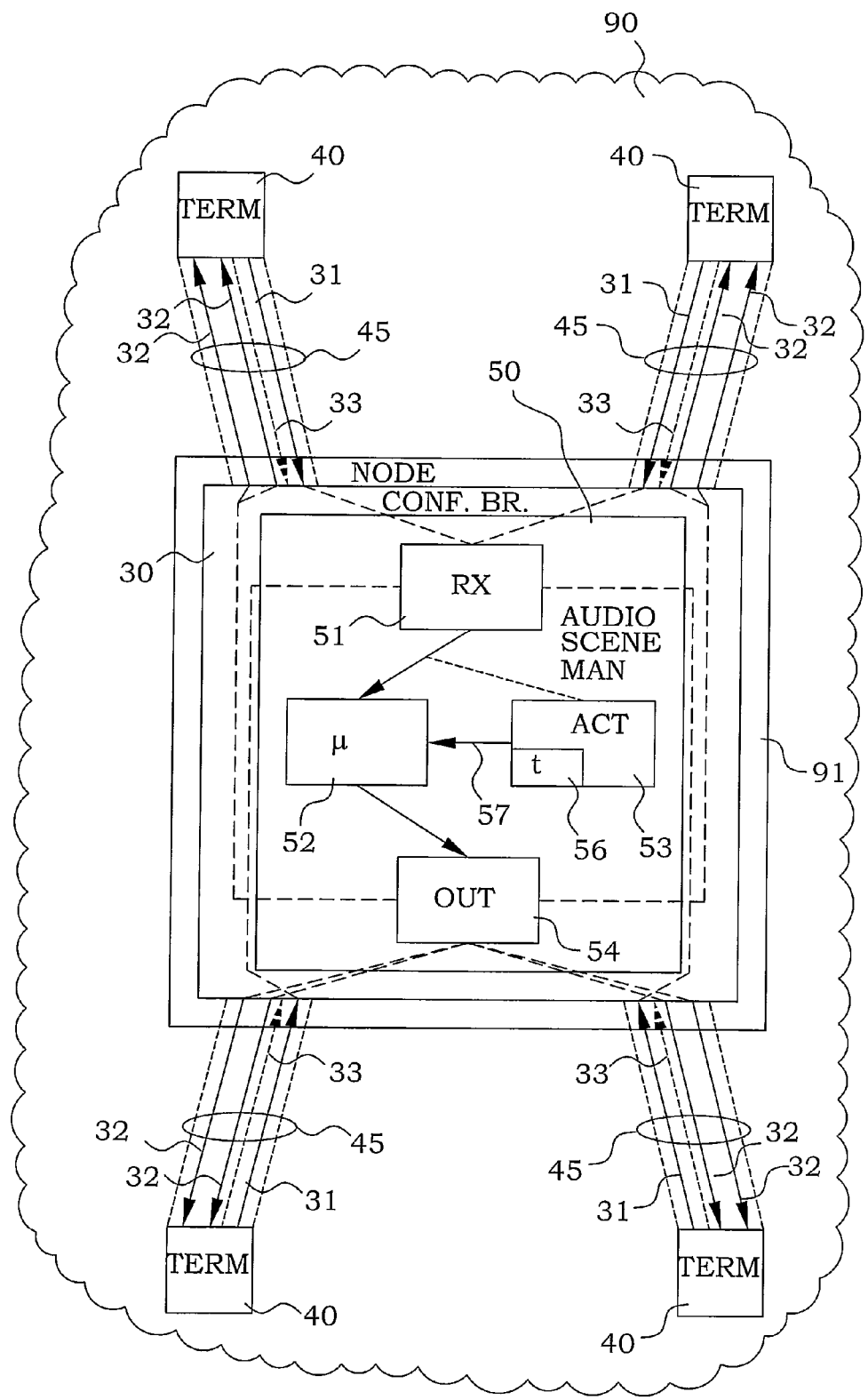
FIGS. 8A-C are block schemes of embodiments of telecommunication networks according to the present invention.

FIG. 8A illustrates an embodiment of a telecommunication network 90 comprising an embodiment of an audio scene manager device 50 according to the present invention. The telecommunication network 90 comprises in this embodiment a conference bridge 30 comprised in a node 91 of the telecommunication network 90. A number of telephone terminals 40, in the illustration four, are connected to the conference bridge 30 by connections 45. In this embodiment, the conference bridge 30 comprises an audio scene manager device 50, connected to the connections 45.

The audio scene manager device 50 comprises a receiver 51. The receiver 51 is arranged for receiving signals representing sound from different transmitting parties of the group sound telecommunication, i.e. signals 31 that are input from the telephone terminals 40. The receiver 51 is connected to a processor 52. The processor is arranged for producing processed signals that produces a perception of a spatial separation of the signals 31 from the different transmitting parties for a receiving party. In other words, the processor 52 is arranged for processing the received signals 31 into processed signals such that sound from one telephone terminal 40, i.e. from one transmitting party, is experienced as emanating from a first angle with respect to a receiving party having another telephone terminal, and sound from another telephone terminal 40, i.e. another transmitting party, is experienced as emanating from a second angle with respect to the receiving party. The second angle is different from the first angle.

The audio scene manager device 50 further comprises means 53 for obtaining measures of sound activity for incoming signals 31, i.e. from the different telephone terminals 40. The means 53 for obtaining measures of sound activity is connected to the processor, for delivering such measures as processing support. The means 53 for obtaining measures of sound activity is in the present embodiment also connected to an output of the receiver 51 for having access to the information about received signals 31. However, in alternative embodiments, such information can be obtained in other ways, e.g. through the processor 52 or to an input of the receiver 51. Also a data communication with the different telephone terminals 40 for transmission of such data can be feasible. The processor 52 is arranged for adjusting at least one of the angles from which sound from the different transmitting parties appear to emanate based on the obtained measures of sound activity, as received from the means 53 for obtaining measures of sound activity. The audio scene manager device 50 also comprises an output 54 for signals 32 representing the processed signals produced by the processor 52, and is therefore connected to the processor 52. From the output 54, the signals 32 are distributed by the connections 45 to the different telephone terminals 40 to present spatially divided sound to any receiving parties. The means 53 for obtaining measures of speech activity may as described further above in certain embodiments comprise a time filter 56.

In the present embodiment, the processor 52 in the audio scene manager device 50 of the conference bridge 30 is responsible for rendering the audio scene for the different participants of the group sound telecommunication. Since the receiving/transmitting party situation is different for each participant, the signals 32 transmitted to the different telephone terminals 40 are different from each other. In other words, an individual rendering is made, but in a central unit, namely the conference bridge 30. All telephone terminals 40 are in this embodiment arranged for receiving at least two streams of audio signals, in order to achieve a spatial perception, e.g. through a pair of headphones. If a telephone terminal 40 in this embodiment is equipped by e.g. 5.1 surrounding audio facilities, six parallel audio streams are necessary.

In many telecommunication systems of today, the actual stream of information is coded into digital form. In such a system, the audio scene manager device 50 typically has to decode the digital signals representing the sound from the different participants. The decoded signals are then treated by the audio scene manager device 50 in order to achieve the different audio signals for the different participants. The audio signals are then typically coded again into a digital format, before they are sent to the receiving parties. The detection of sound activity can also advantageously be performed on the decoded signals. However, there are also techniques also checking activity levels directly in coded bit streams.

Since the audio scene management is dependent on the actual set of audio devices at the receiver end, the conference bridge 30 has in the present embodiment to have knowledge of the different end equipments. Such information can e.g. be provided by providing control signals 33 from the telephone terminals 40 to the audio scene manager device 50. Preferably, such control signalling takes place at the beginning of a group sound telecommunication session and every time a new participant is connected.

Figure 8B:
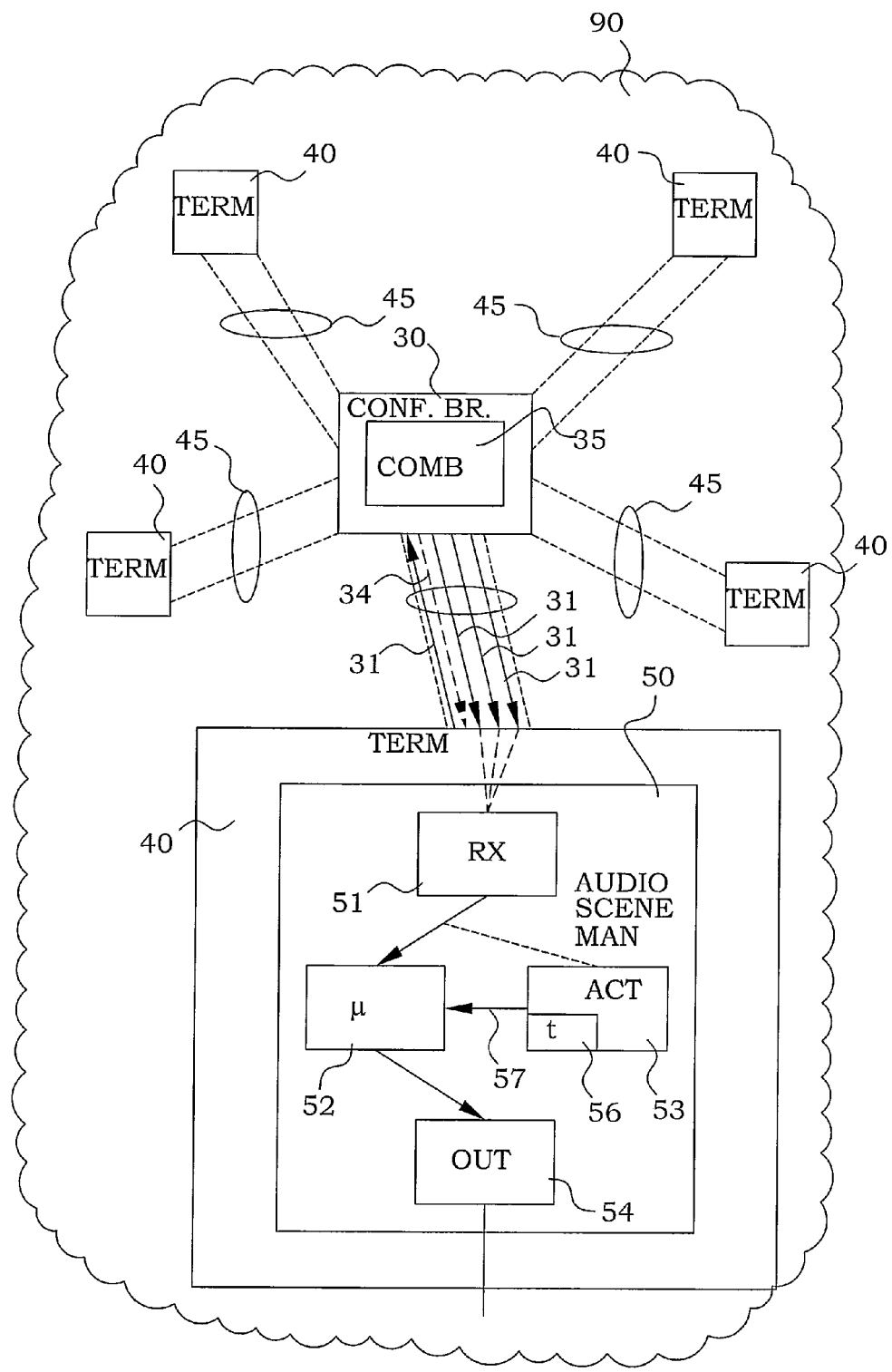

FIG. 8B presents another embodiment of a telecommunication network 90 comprising an embodiment of an audio scene manager device 50 according to the present invention. This telecommunication network 90 instead operates in a distribute manner, where the local rendering of the audio scene is processed at each participating party. A combiner 35 receives incoming sound signals from the different participants and forwards these signals to each participating parties, preferably with the exception of the sound signal that was received from each particular party. In other words, each of the five participating parties receives separate sound signals from each of the other participating parties. This means that in a group sound telecommunication having n participants, n–1 sound signals are transferred from the combiner 35 to each terminal 40.

In each telephone terminal 40, there is an audio scene manager device 50. The details of the audio scene manager device 50 are only illustrated for one of the terminals for increasing the readability of the figure. The audio scene manager device 50 is basically arranged in the same manner as in the previous embodiment. However, in the present embodiment, the processor 52 only has to perform rendering of the local audio scene. The output 54 is in this embodiment configured to suit the type of audio equipment, not illustrated in FIG. 8B, by which the sound is going to be presented to the user. In this respect, no control signalling concerning equipment demands is necessary.

In a preferred variation of the embodiment of FIG. 8B, the different audio scenes of the different participants are coordinated in such a way that the same mutual order around a virtual conference table is preserved. A certain participant thereby always has the same closest neighbour participants and appears on the same side of the neighbours for all local audio scenes. For such a situation, information about the internal order of participants has to be supplied to the different local audio scene manager devices 50, e.g. by control signals 34. The decision about the internal order can be taken by the conference bridge 30, e.g. depending on the order in which the participants are connected to the group sound telecommunication session.

The number of separated sound streams increases with the number of participants. For very large number of participants, it becomes impractical to reserve a separate sound signal resource for each participant. A possible solution for situations where many parties participate is to only provide sound signals from the most active parties. In a group sound telecommunication, there is typically only a few concurrent speakers. If the sound from a silent party is omitted for transmission to the other participants, there will be essentially no difference. When the activity changes, other signals can be selected to be forwarded. By having for instance four available streams for transmitting parties, most group sound telecommunication situations are possible to cover, without loosing any important information. However, by changing the forwarded sound signals, the receivers have to receive also some control signalling identifying the active speakers, so that the local rendering of the audio scene can be kept only slowly adaptive. Such information can also be included in the control signals 34.

Also in the embodiment of FIG. 8A, restrictions to only processing sound from the most active participants may be applied, since this may reduce the overall complexity in the processing of the signals.

Figure 8C:
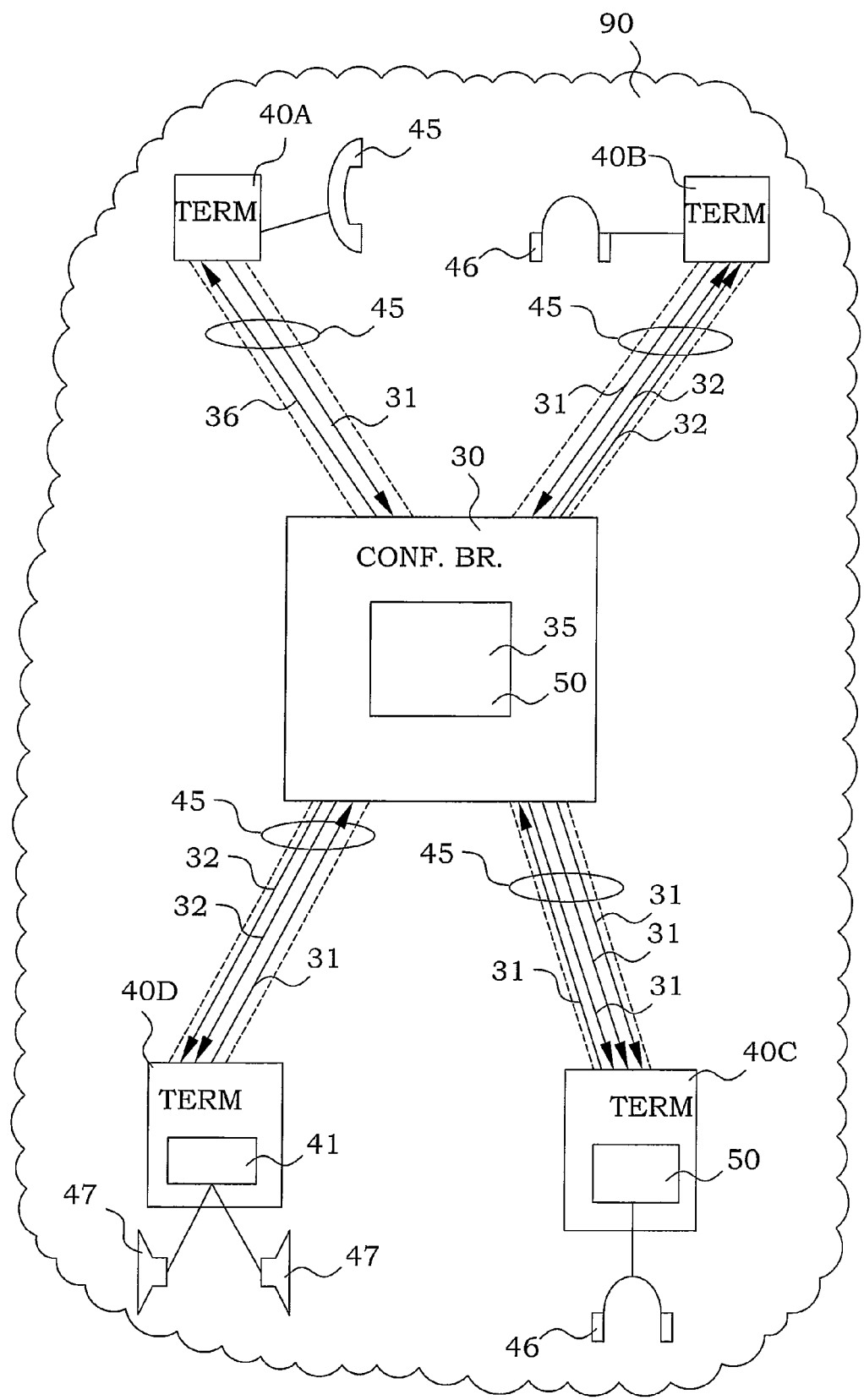

In the embodiments presented in FIGS. 8A and 8B, all participating parties have basically the same equipment or at least the same type of relation to the conference bridge. In a general case, however, different participants can be configured in different ways. FIG. 8C illustrates an embodiment of a telecommunication network 90, where participants of a group sound telecommunication have different end user equipment and different relations to the conference bridge 30. A first user has a telephone equipment 40A having only traditional monophonic presentation, here illustrated by a traditional handset 45, whereby no spatial separation of participants is possible. A combined signal 36 from the other participants is transferred. The audio scene manager device 50 in the conference bridge 30 here operates as a combiner 35 with respect to the telephone equipment 40A. Furthermore, the different streams of sound from the different other participants are all combined into one single sound signal, which is provided to the telephone equipment 40A.

A second telephone equipment 40B is equipped with a pair of headphones 46, but no local audio scene managing equipment. The situation here is in analogy with what is illustrated for each party in FIG. 8A. A third telephone equipment 40C is also equipped with a pair of headphones 46. However, the telephone equipment 40C is additionally equipped with a local audio scene managing equipment 50. The situation here is in analogy with what is illustrated for each party in FIG. 8B. Finally, a fourth telephone equipment 40D utilises a pair of stereo loudspeakers 47. In this particular embodiment, the telephone equipment 40D is additionally equipped with a local audio scene adaptation renderer 41. The local audio scene adaptation renderer 41 receives signals 32, which are adapted to be used in a pair of headphones, and adapt these signals into adapted signals, which instead are suited for presentation via the stereo loudspeakers 47. In such a case, the audio scene managing is split into two parts, one in the central conference bridge 30 and one in the telephone equipment 40D.

In an alternative embodiment, where the telephone equipment 40D does not comprise any local audio scene adaptation renderer 41, signals 32 that are adapted for stereo loudspeakers 47 may be provided directly from the audio scene managing equipment 50 of the conference bridge 30.

Up to now all participants of the group sound telecommunication have been seen as individuals by the group sound telecommunication renderer and have been assigned individual spatial positions in the virtual rooms. This is the obvious way of handling participants with their own capturing device, e.g. a handset or headset. However, in a not too uncommon case for teleconferences, several persons may be located in the same room and they all share the same audio capturing device.

The simplest way of handling this case in a virtual group sound telecommunication is to treat each room as an individual was treated in the previous described scenarios, i.e. each room gets a spatial position in a virtual room. A virtual scene for a first room participating in a group sound telecommunication with participants in two other rooms can be rendered to reflect a room separation. This is illustrated schematically in FIG. 9A. having a first room 16 as a receiving party 15 and a second and third room 19 as two transmitting parties 20. In this case, the participants in room 1 would easily separate talkers in room 2 from talkers in room 3, but all talkers in the same room would be perceived as located at the same position.

However, in certain cases, there might be possible to achieve information also about spatial distribution within one and the same room. For instance, by using different kinds of source separation techniques one can in many cases identify different talkers located in the same room. By separating the sound originating at each individual talker, they can be positioned at different spatial locations in the virtual room. Preferably such positioning is performed around a common room position. This would result in a scene for the participants in room 1 as shown in FIG. 9B. In other words, if sound signals from at least one transmitting party comprises sound from a plurality of sources separated in space, a separation in the virtual space can be achieved. Preferably, the processing of the received signals into processed signals is such that the plurality of sources are experienced as emanating within a limited angle sector with respect to the receiving party. The limited angle sector then comprises solely sound sources from the same transmitting party. Even more preferably, the plurality of sources are positioned in angle depending on spatial distribution information of a real space of the plurality of sources. In such a way, an internal order of different speakers in one room can be preserved.

As seen in FIG. 9B, the three participants in room 2 are now positioned around the spatial position for room 2 and the two participants in room 3 are positioned around the spatial position for room 3. This enables the participants in room 1 to separate all participants of the group sound telecommunication and not only the rooms.

A similar solution can be applied to a scenario when the participants are single participants as described earlier and groups of the participants have a common attribute, e.g. they belong to the same company. In this case each group can be treated as each room was treated above, i.e. each group gets a spatial position and the members of that group are placed around that position.

As mentioned above, the spatial distribution information of a real space of the plurality of sources may be achieved by source separation techniques. All scenarios shown above have thus been described irrespective of the audio capturing device(s). However, the spatial distribution information of a real space of the plurality of sources can also be achieved by utilizing stereo speech capturing in the real space. A special case is when stereo microphones are used since one can take advantage from the spatial information that is already present in the captured stereo signal. If three rooms are assumed to use stereo microphones for capturing the speech, then the rooms can get spatial positions by simulating virtual loudspeakers 18, as shown in FIG. 9C.

Each channel of respective stereo signal is then treated as a point source that will be played through a virtual loudspeaker, e.g. the left signal from room 2 will be played through the left virtual loudspeaker for room 2 and the right signal through the right virtual loudspeaker. By doing this, all persons in respective room will appear to lie between the two virtual loudspeakers for respective room, which means that the listeners in room 1 will perceive the persons of the other rooms to be located at different spatial locations.

An extension to this solution can be to incorporate source identification in the group sound telecommunication renderer or on the capturing side in order to detect how many persons that is present in respective room. The virtual loudspeakers for a room that contains many persons could for example be placed with a greater angle distance between them than the virtual loudspeakers for a room with few persons. This result in that the persons of the room with many participants are spread out in a larger area than the persons of the room with few participants and the separation between each person gets more evenly distributed.

The grouping of individuals described earlier can also be used for individuals with stereo microphones. The stereo signals of all members in a group can be added together before the respective summed channel is rendered to be played through a virtual loudspeaker. This would result in that the different members of a group seam to originate from the same room and all members of respective group will have a spatial position between the respective two virtual loudspeakers.

The adaptive separation methods described earlier can, of course, also be applied to the room (or group) positioning methods. When more rooms join the conference the distance between the virtual loudspeakers can be squeezed together in order to make room for the new rooms. Also, rooms that contain active talkers can be separated apart while rooms containing participants that never speak can be squeezed together. Moreover, if source separation/detection is used one can squeeze together silent participants in a room and spread out active participants in order to maximize the spatial separation. Head turning can also be enabled, both automatically by the group sound telecommunication renderer as well as manually by the users.

The present invention has a lot of advantages. Some of them are discussed here below. Positioning virtual participants on an arc at the same distance from the virtual listener results in the same distance attenuation for all virtual participants. By constraining the maximum allowed angle to a virtual person results in that the far left and far right persons do not sound unpleasant and turning the virtual head may not be needed. The adaptive turning of the virtual head automatically towards an active talker results in that the active talker becomes located more in front of the virtual listener without any effort from the listener and the listener can instead keep the concentration to the conversation.

Adaptively changing positions of the virtual persons with respect to their speech activity results in that the active talkers are separated apart increasing their spatial separation. It can also result in that more persons can be included in a group sound telecommunication without losing the spatial separation between active talkers.

Playing the left and right channel of a stereo captured signal through two virtual loudspeakers results automatically in that the persons in the captured room become positioned at different spatial locations between the two virtual loudspeakers.

Although the different types of scenarios have been described separately they can all be combined and connected to the same conference bridge. For example, individual users can be included in a group sound telecommunication with rooms that contain several persons and groups of individuals can also join.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of audio scene management in a group sound telecommunication in which physically separated parties are virtually positioned in a virtual room, said group sound telecommunication comprising at least a first transmitting party, a second transmitting party and a receiving party, said method comprising performing the following steps using an audio scene manager device:
  receiving signals representing sound of said first transmitting party and sound of said second transmitting party;
  obtaining measures of sound activity for said first and said second transmitting parties, respectively;
  selecting at least a first angle and a second angle based on said obtained measures of sound activity;
  processing said received signals into processed signals such that sound from said first transmitting party is being experienced as emanating from said first angle with respect to said receiving party and sound from said second transmitting party is being experienced as emanating from said second angle with respect to said receiving party, said second angle being different from said first angle;
  outputting signals representing said processed signals; and
  when signals representing sound are received from transmitting parties in addition to said first and said second transmitting parties, performing the additional steps of:
    further obtaining measures of sound activity of each additional transmitting party;
    further selecting a virtual angle of placement for each additional transmitting party based on the corresponding obtained measures of sound activity, wherein the virtual angle of placement is selected in such a manner that the first transmitting party, the second transmitting party, and each additional transmitting party is virtually placed separately within an angle sector with respect to the receiving party, and wherein the angle of separation between any two neighboring transmitting parties within the angle sector is inversely proportional to the total number of transmitting parties;
    further processing the received signals from all transmitting parties into additional processed signals such that sound from all transmitting parties are being experienced as emanating within the angle sector; and
    further outputting signals representing said additional processed signals.

2. The method according to claim 1, wherein said angle sector is dependent on the total number of parties in said group sound telecommunication.

3. The method according to claim 1, wherein the angle sector is 120 degrees with respect to said receiving party.

4. The method according to claim 1, wherein the angle sector is 90 degrees with respect to said receiving party.

5. The method according to claim 1, herein said step of selecting comprises adjusting of an angle separation from one transmitting party to a closest neighboring transmitting party depending n said obtained measures of sound activity.

6. The method according to claim 5, wherein said angle separation is adjusted to be larger for a transmitting party being associated with a high measure of sound activity than for a transmitting party being associated with a low measure of sound activity.

7. The method according to claim 1, wherein said step of selecting comprises reducing an angle, with respect to a front direction of said receiving party, for the transmitting party having a highest said obtained measure of sound activity.

8. The method according to claim 1, wherein a mutual order of angles of all transmitting parties of said group sound telecommunication is maintained during selecting of said angles.

9. The method according to claim 1, wherein said sound signals from at least one transmitting party include sound from a plurality of sources separated in space, wherein said step of processing comprises processing of said received signals into processed signals such that said plurality of sources is being experienced as emanating within a limited angle sector, said limited angle sector comprising solely sound sources from said at least one transmitting party.

10. The method according to claim 9, wherein said sources of said plurality of sources are angularly positioned depending on spatial distribution information of a real space of said plurality of sources.

11. The method according to claim 10, wherein said spatial distribution information of a real space of said plurality of sources is achieved by source separation techniques.

12. The method according to claim 10, wherein said spatial distribution information of a real space of said plurality of sources achieved by utilizing stereo speech capturing in said real space.

13. he method according to claim 1, wherein said step of obtaining measures of speech activity comprises time filtering of true speech activity.

14. The method according to claim 13, wherein said time filtering comprises delays.

15. The method according to claim 13, wherein said time ring comprises averaging.

16. The method according to claim 1, wherein said step of processing comprises at least the steps of:
  creating a first signal based on said received signals from said first transmitting party filtered by a first filter dependent on said first angle and based on said received signals from said second transmitting party filtered by a second filter dependent on said second angle; and
  creating a second signal based on said received signals from said first transmitting party filtered by a third filter dependent on said first angle and based on said received signals from said second transmitting party filtered by a fourth filter dependent on said second angle.

17. The method according to claim 16, wherein said first and second signals are left and right signals respectively, for a pair of headphones.

18. The method according to claim 16, wherein said first and second signals are left and right signals, respectively, for a pair of stereo loudspeakers.

19. The method according to claim 16, wherein said first and second signals are signals of a surround audio system.

20. The method according to claim 16, further comprising the audio scene manager device coding said first and said second signals into digital signals representing audio signals.

21. An audio scene manager device for use in a group sound telecommunication in which physically separated parties are virtually positioned in a virtual room, comprising:
  a receiver for receiving signals representing sound of at least a first transmitting party and a second transmitting party of a group sound telecommunication;

means, connected to a processor, for obtaining measures of sound activity for said first and said second transmitting parties, respectively;

said processor connected to said receiver and configured to perform the following:

select at least one of a first angle and a second angle based on said obtained measures of sound activity, and process said received signals into processed signals such that sound from said first transmitting party is being experienced as emanating from said first angle with respect to a receiving party of said group sound telecommunication and sound from said second transmitting party is being experienced as emanating from said second angle with respect to said receiving party, said second angle being different from said first angle; and an output, connected to said processor, for outputting signals representing said processed signals;

wherein the receiver is configured to receive signals representing sound from transmitting parties in addition to said first and said second transmitting parties;

wherein the means for obtaining measures is configured to obtain measures of sound activity of each additional transmitting party;

wherein the processor is further configured to perform the following:

select a virtual angle of placement for each additional transmitting party based on the corresponding obtained measures of sound activity, wherein the virtual angle of placement is selected in such a manner that the first transmitting party, the second transmitting party, and each additional transmitting party is virtually placed separately within an angle sector with respect to the receiving party, and wherein the angle of separation between any two neighboring transmitting parties within the angle sector is inversely proportional to the total number of transmitting parties, and process the received signals from all transmitting parties into additional processed signals such that sound from all transmitting parties are being experienced as emanating within the angle sector; and wherein the output is configured to output signals representing the additional processed signals.

22. The audio scene manager device according to claim 21, wherein said angle sector is dependent on the total number of parties in said group sound telecommunication.

23. The audio scene manager device according to claim 21, wherein said processor is further configured to adjust an angle separation from one transmitting party to a closest neighboring transmitting party depending on said obtained measures of sound activity.

24. The audio scene manager device according to claim 21, wherein said processor is further configured to reduce an angle, with respect to a front direction of said receiving party, for the transmitting party having a highest said obtained measure of sound activity.

25. The audio scene manager device according to claim 21, wherein said receiver is configured to receive sound signals from at least one transmitting party comprising sound from a plurality of sources separated in space, wherein said processor is further configured to process said received signals into processed signals such that said plurality of sources is being experienced as emanating within a limited angle sector; said limited angle sector comprising solely sound sources from said at least one transmitting party.

26. The audio scene manager device according to claim 21, wherein said means for obtaining measures of speech activity comprises a time filter.

27. The audio scene manager device according to claim 21, wherein said processor is configured to create a first signal based on said received signals from said first transmitting party filtered by a first filter dependent on said first angle and based on said received signals from said second transmitting party filtered by a second filter dependent on said second angle, and wherein said processor is further configured to create a second signal based on said received signals from said first transmitting party filtered by a third filter dependent on said first angle and based on said received signals from said second transmitting party filtered by a fourth filter dependent on said second angle.

28. The audio scene manager device according to claim 27, wherein sad first and second signals are left and right signals, respectively, for a pair of headphones.

29. The audio scene manager device according to claim 27, wherein said first and second signals are left and right signals, respectively, for a pair of stereo loudspeakers.

30. The audio scene manager device according to claim 27, wherein said first and second signals are signals of a surround audio system.

31. The audio scene manager device according to claim 27, wherein said processor is further configured to code said first and said second signals into digital signals representing audio signals.

32. The audio scene manager device according to claim 21, wherein the device is implemented in a telephone terminal.

33. The audio scene manager device according to claim 21, wherein the device is implemented in a conference bridge.

* * * * *

UNITED STATES PATENT AND TRADEMARK OFFICE
CERTIFICATE OF CORRECTION

| | | |
|---|---|---|
| PATENT NO. | : 8,503,655 B2 | Page 1 of 1 |
| APPLICATION NO. | : 12/601251 | |
| DATED | : August 6, 2013 | |
| INVENTOR(S) | : Sandgren et al. | |

It is certified that error appears in the above-identified patent and that said Letters Patent is hereby corrected as shown below:

In the Specification

In Column 5, Line 24, delete "$h^r_L$" and insert -- $h^R_L$ --, therefor.

In Column 8, Line 66, delete "-αhd max" and insert -- $-\alpha_{max}$ --, therefor.

In Column 11, Line 2, delete "time At" and insert -- time $\Delta t$ --, therefor.

In the Claims

In Column 17, Line 62, in Claim 5, delete "herein" and insert -- wherein --, therefor.

In Column 17, Line 65, in Claim 5, delete "n said" and insert -- on said --, therefor.

In Column 18, Line 30, in Claim 12, delete "sources" and insert -- sources is --, therefor.

In Column 18, Line 32, in Claim 13, delete "he" and insert -- The --, therefor.

In Column 18, Line 38, in Claim 15, delete "ring" and insert -- filtering --, therefor.

In Column 18, Line 52, in Claim 17, delete "right signals" and insert -- right signals, --, therefor.

In Column 20, Line 34, in Claim 28, delete "sad" and insert -- said --, therefor.

Signed and Sealed this
Twenty-seventh Day of May, 2014

Michelle K. Lee
*Deputy Director of the United States Patent and Trademark Office*